April 7, 1970  R. F. ZURCHER  3,504,566
MECHANICAL ALIGNMENT DEVICE
Filed May 31, 1968  2 Sheets-Sheet 1
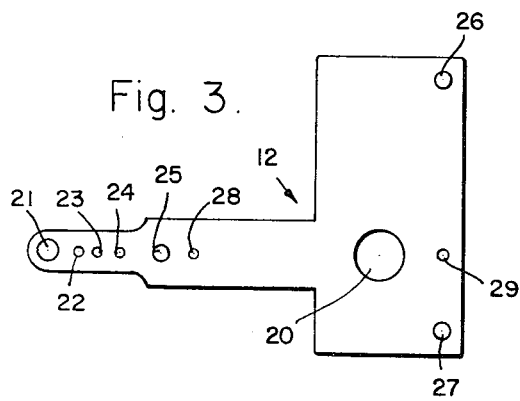
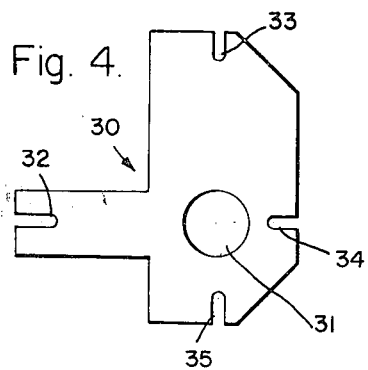
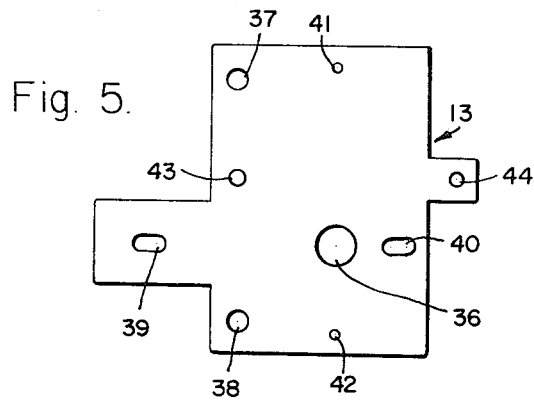
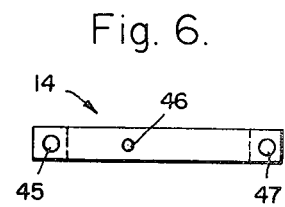
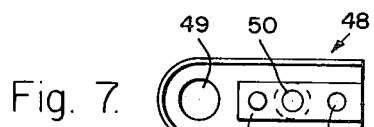
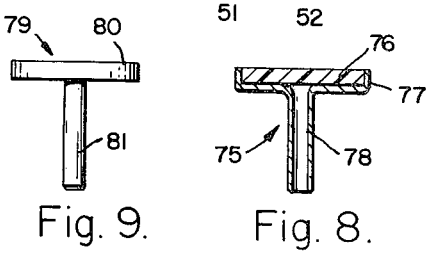
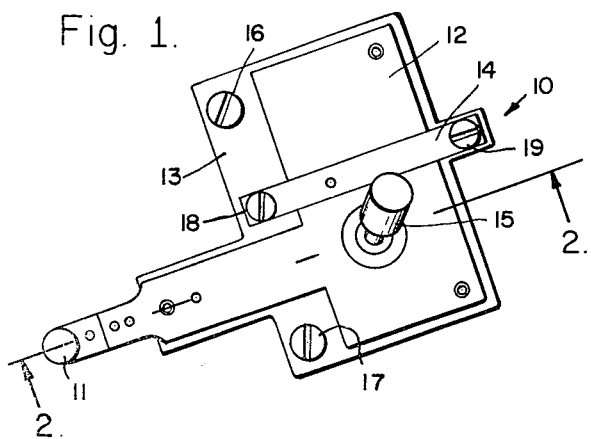
Rudolf F. Zurcher,
INVENTOR.
BY.
*a. M. Lesniak*
ATTORNEY.

Rudolf F. Zurcher,
INVENTOR.
BY
*A. M. Lesnick*
ATTORNEY.

3,504,566
MECHANICAL ALIGNMENT DEVICE
Rudolf F. Zurcher, Newport Beach, Calif., assignor, by mesne assignments, to GTI Corporation, Meadville, Pa., a corporation of Rhode Island
Filed May 31, 1968, Ser. No. 733,347
Int. Cl. G05g 7/00
U.S. Cl. 74—469          25 Claims

ABSTRACT OF THE DISCLOSURE

An alignment fixture for precisely positioning and orienting small objects is disclosed. A pair of plates are coupled to a control stick which is movable about a pivot point associated with one of the plates to cause the other plate to translate relative to the one plate. A rotatable platform adapted to receive a small object is mounted upon and supported by the other plate and coupled by a pulley system to said control stick whereby the platform may be rotated by rotating the control stick about its axis. The control stick can be held between a thumb and finger and twirled and pivoted as desired to obtain wide angle rotation and rapid translation of the platform.

---

This invention relates to a mechanical alignment device of the type having a movable support member useful in alignment operation involving very small or minute objects. More particularly the invention relates to such a device wherein operator controlled motion of a single control member is converted to corresponding motion of a support platform adapted to receive minute objects thereon.

Generally in the handling of very small objects or articles various situations arise which require that the object or article be precisely positioned and oriented, with a minimum of time and effort. Heretofore various devices have been provided for rotating and translating support platforms during alignment operations. In such devices an object placed on a support platform or member is positioned and oriented by rotating and translating the platform as desired.

In one exemplary prior art device the support platform is mounted near one end of a pantograph arrangement and is controllably translated by moving a hand-grippable knob at the remote end of the pantograph. The support platform is connected to a motor driven shaft. Control buttons for rotating the support platform are mounted in the knob and are selectively actuated to cause the motor to rotate the support platform in a clockwise or counterclockwise direction. Another prior art device involves a pair of elongated control members for respective coarse and fine adjustment of support platform position and orientation. In this device the support platform is operably coupled to a rotatable wheel which may be turned in order to rotate the support platform.

In general, prior art alignment devices are built into other equipment and are not self contained. These devices are generally bulky and complicated. Such devices generally utilize a large reduction of input motion to secure the small incremental motions generally involved in precisely positioning and aligning small objects placed on the support and thus require and undue amount of concentration and effort on the part of the operator.

Accordingly, it is an object of the invention to provide an alignment device overcoming the disadvantages associated with various prior art devices.

It is a further object of the invention to provide an alignment device having a rotatable support platform mounted in a translatable plate and operably controllable by the actuation of a single manually operable control member which may be in the form of a stick or lever.

Another object is to provide a compact self contained alignment device of low mass and of relatively simple construction particularly adapted for the expeditious handling of very small objects during various alignment operations.

The aforesaid and other objects and advantages are accomplished by the utilization of an elongated control member in the form of a pivoted stick or lever which can be held between a thumb and finger and twirled and pivoted as desired, and which is mechanically coupled to a support platform in such a fashion that rotation of said control member about a pivot point produces corresponding planar motion of a support platform whereas axial rotation of the control member produces corresponding axial rotation of the support platform whereby wide angle rotation and rapid translation of the support platform is obtained. Support platform planar and rotational motions can occur at the same time in response to operator controlled movement of the control member. Natural visual-kinesthetic interactions of the operator, without learn on time, allow the operator to guide the movement of the control member to produce desired movement of the support platform.

These and other objects and features will become apparent from the following description and accompanying drawings:

FIGURE 1 is a plan view of a device embodying the invention.

FIGS. 3–7 illustrate in detail the configuration and structure of various parts of the embodiment of the invention shown in FIGS. 1 and 2. More specifically, FIG. 3 is a plan view of a slideable plate while FIGS. 4–7 are respective plan views of an X–Y guide plate, a base plate, a yoke, and bearing bracket utilized in the FIGS. 1 and 2 embodiment of the invention.

FIGS. 8 and 9 show additional modified support members which can be utilized in lieu of the support member shown in FIGS. 1 and 2, wherein FIG. 8 is a side sectional view and FIG. 9 is a side view.

Figure 2:
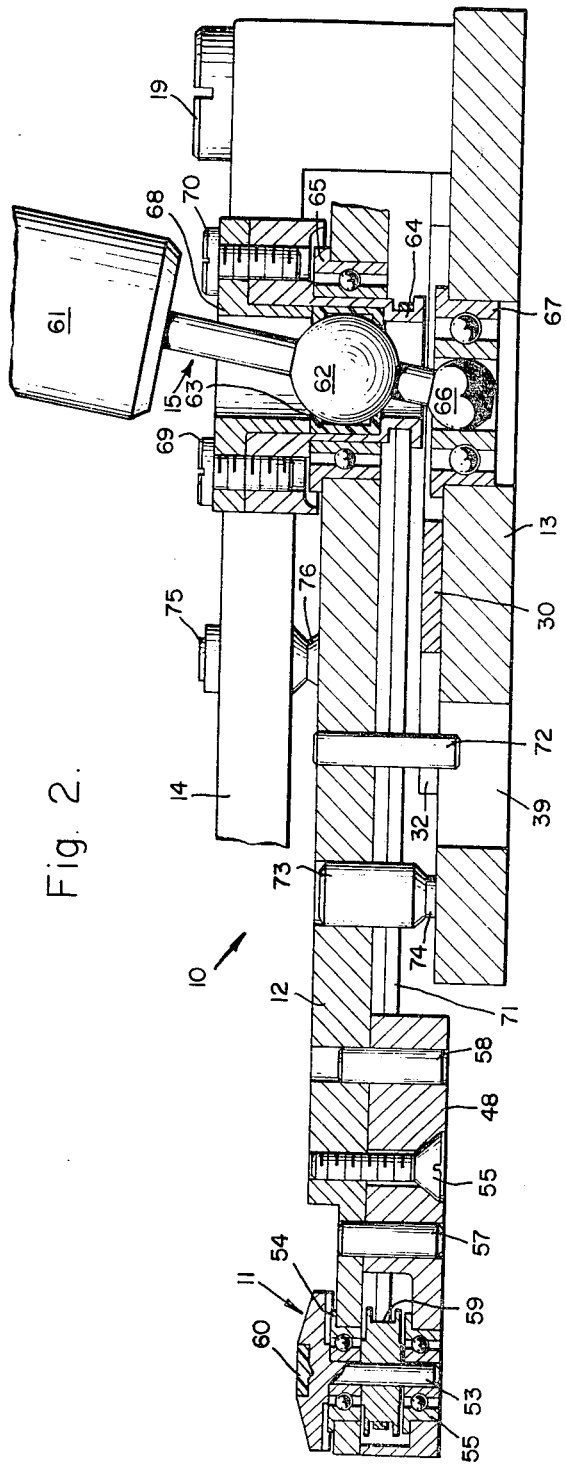
FIG. 2 is an enlarged cross-sectional view of the FIG. 1 device taken along line 2—2 thereof and having certain parts cut away for illustrative purposes.

Referring now to FIG. 1 there is shown an embodiment of the invention comprising an alignment device 10 having a support member 11 rotatably mounted in an aperture in slideable plate 12. Slideable plate 12 is disposed over a base plate 13 and retained thereat by yoke 14. Control member or pivoted lever 15 (shown in slanted position) is in the form of a control stick mounted in respective apertures in plates 12 and 13 so that pivoted movement thereof produces corresponding planar movement of plate 12 and hence platform 11 relative to plate 13. Further the control member 15 is operably connected to the platform 11 by a pulley arrangement (not shown in FIG. 1) whereby axial rotation of control member 15 produces corresponding rotation of platform 11 which is carried by plate 12. Screws 16 and 17 may be used to secure plate 13 to a supporting member (not shown) while screws 18 and 19 secure yoke 14 to plate 13.

Before referring to FIG. 2, which shows the alignment device 10 in greater detail, it is deemed desirable to direct attention to FIGS. 3–7 which shows the details of respective elements utilized in the embodiment of FIGS. 1 and 2. Specifically the various elements shown in FIGS. 3–7 will be described with reference to their employment in the alignment device shown in FIGS. 1 and 2.

In FIG. 3 there is shown slideable plate 12 having a plurality of openings 20–29 therein. Main opening 20 is adapted to receive control member 15 and associated elements. Opening 21 is adapted to receive platform 11 and associated elements. Openings 22, 23, and 24 are adapted to receive elements whereby a bearing bracket can be secured to the plate 12. Opening 25, 26, and 27 are adapted to receive respective spacing means for spacing slideable plate 12 from the base plate 13 which is shown in FIG. 5. Openings 28 and 29 are adapted to receive guide pins which cooperate with guide slots in the X–Y guide plate 30 shown in FIG. 4.

In FIG. 4 there is shown an X–Y guide plate 30 having main opening 31 and a plurality of peripheral slots 32–35 therein. Opening 31 is adapted to receive the member 15 and associated elements and slots 32–35 function as guide slots which are adapted to receive guide pins projecting from plates 12 and 13 respectively.

FIG. 5 shows the plate 13 having openings 36–44 therein. Main opening 36 is adapted to receive control member 15 and associated elements. Openings 37 and 38 are adapted to receive screws 16 and 17 for the purpose of securing plate 13 to the support member. Openings 39 and 40 function as clearance and stroke limiting slots for guide pins depending from plate 12, while openings 41 and 42 are adapted to receive guide pins which project from plate 13 toward plate 12. Openings 43 and 44 are adapted to receive screws 18 and 19 for securing yoke 14 to plate 13.

FIG. 6 shows yoke 14 having openings 45–47 therein. Openings 45 and 47 are adapted to receive screws 18 and 19 for securing yoke 14 to plate 13. Opening 46 is adapted to receive a means for spacing yoke 14 from plate 12.

FIG. 7 shows bearing bracket 48 which is adapted to be secured to base plate 12. Opening 49 therein is adapted to receive support member 11 and associated elements. Opening 50 is adapted to receive a screw for securing bracket 48 to plate 12 while openings 51 and 52 are adapted to receive dowels for holding the bracket 48 and plate 12 in alignment. The bearing bracket 48 has a generally U-shaped channel therein defined by a peripheral ridge wall and the ridge in which openings 50–52 are situated. Opening 49 is located in the floor of the channel near the closed end thereof. This channel is adapted to receive a pulley or transmission belt therein (designated as numeral 71 in FIG. 2).

Having thus described the certain elements of the mechanism 10, attention is directed to FIG. 2 wherein these elements are shown in their cooperative interrelationships.

In FIG. 2 the mechanism 10 is shown as comprising support member 11 having a platform affixed to rotatable shaft 53. Shaft 53 is mounted in a pair of flanged annular ball bearings 54 and 55 which are respectively press fit into openings 21 and 49 of plate 12 and bearing bracket 48. Bearing bracket 48 is secured to the underside of plate 12 by screw 56 mounted in opening 23 and opening 50. Dowel 57 is held in openings 22 and 51 and dowel 58 is held in openings 24 and 52. Pulley 59 is affixed to shaft 53.

Support member 11 can have a central opening in the top surface thereof filled with insulating material 60. Various other support members may be utilized in lieu of this specific support member; FIGS. 8 and 9 showing two exemplary modifications or alternate support members which may be employed. Control member 15 has a handle 61, shown partially cut away, secured thereto by a set screw (not shown). Member 15 can have a ball or first spherical member 62 which engages resilient sleeve 63.

Sleeve 63 can be of any suitable material however it is preferred to employ materials containing a fluorocarbon substance. Fluorocarbon substances such as polyetetrafluoroethylene (TFE or PTFE) and polyfluoroethylenepropene (FEP) may be utilized.

Commercially available Teflon is an example of fluorocarbon substances which may be used. Both TFE and FEP are characterized by having respective kinetic coefficients of friction which are the same as their respective static coefficients of friction. This characteristic desirably helps to ensure smooth non-erratic operation and eliminates slip-stick characteristics. TFE is unique in that it has the lowest coefficient of friction of any known solid material. Such substances can be combined with a conventional filler to increase the amount of wear that the sleeve can withstand. With such fillers wear can be reduced by a factor of a thousand times. These substances are so slippery that nothing sticks to them. While an exhaustive discussion of the characteristics of these commercially available materials is not deemed necessary, it suffices to say that use of fluorocarbon substances is deemed expedient.

Pulley 64 is press fit into flanged ball bearing 65 which in turn is press fit into main opening 20 of plate 12. Member 15 has a second spherical member 66 swivelably mounted in ball bearing 67 which in turn is press fit into main opening 36 of plate 13. As can be seen members 62 and 66 can pivot and rotate within predetermined limits and thus respectively form part of respective universal joints of the ball and socket variety.

Compression gland 68 is secured to pulley 64, as for example by screws 69 and 70 threaded into respective openings in the compression gland 68 and pulley 64. Compression gland 68 compresses the sleeve 63 while retaining it in position between member 62 and pulley 64. Pulley belt 71 operatively interconnects pulleys 64 and 59 while sleeve 63 provides sufficient friction between member 62 and pulley 64 whereby rotation of member 15 will result in rotation of pulley 64 and hence in rotation of pulley 59 whereby platform 11 will rotate.

The X–Y guide plate 30, shown in FIG. 4, is interposed between plates 12 and 13. The member 15 extends through main opening 31 in plate 30. Guide slot 32 of plate 30 is disposed over the clearance and stroke limiting slot 39 of plate 13. A guide pin 72 mounted in opening 28 extends from plate 12 into slots 32 and 39. A similar guide pin mounted in opening 29 of plate 12 extends into respective guide slots 34 and 40 in guide plate 30 and plate 13 respectively (not shown). The guide slots 33 and 35 of guide plate 30 receive guide pins mounted in openings 41 and 42 of the plate 13 which project toward the plate 12 (not shown). By this arrangement when member 15 is moved in a desired direction plate 12 will be guided in a corresponding direction.

In order to space plate 12 from plate 13 and to allow plate 12 to be slideable relative to plate 13, the openings 25, 26 and 27 of plate 12 receive respective adjustable set screws such as the screw 73 shown. These screws 73 carry respective feet 74, which can be of any suitable material, preferably one that has excellent antistick characteristics, low friction, and high wear resistance such as Teflon. These feet 74 engage one surface of plate 13 and are slideable thereover.

The left side of FIG. 2 is broken away to show one manner of securing yoke 14 to plate 13. These members are held together by screw 19 inserted in openings 47 and 44 of the yoke 14 and plate 13 respectively. A similar screw 18 is inserted in corresponding opening 45 and 43 (not shown). The adjustable set screw 75, which is received in yoke opening 46, carries a foot 76, which can be of Teflon, which engages a surface of plate 12. When member 15 is operated to cause transverse movement of plate 12 the foot 76 slides over the surface of plate 12. The foot 76 preferably is positioned intermediate the locations of feet 74 in order to limit the movement of plate 12 to substantially planar motion.

Having thus described an embodiment of the invention the operation thereof may now be summarized. The operator is able to move the control member in any direction. When plate 13 is fixed or held stationary and the operator moves the control member 15 in a circular arc about the geometrical center of spherical member

66 the plate 12 will translate laterally relative to plate 13; the spherical member 62 slipping along the abutting surface area of resilient sleeve 63. The direction of translation of plate 12 corresponds to the direction of the circular arc. Thus if the control member 15 moves from right to left as viewed in FIG. 2, the plate 12 moves from right to left. Axial rotation of control member 15 will result in corresponding rotation of support member 11; the resilient sleeve 63 providing sufficient frictional coupling whereby pulley 64 rotates thereby driving pulley belt 71 and hence rotating support member 11. In the embodiment of FIG. 2 axial rotation of control member 15 through a selected angle rotates the support member through a substantially identical angle however it should be apparent that the size of the respective elements may be modified as a matter of choice; the basic requirement being that the support member 11 be rotated in response to rotation of control member 15.

While a particular embodiment of the invention has been disclosed, it should be understood that the invention may be embodied in various equivalent mechanisms as determined by the wherewithal of a skilled workman. Thus for example FIGS. 8 and 9, as previously indicated, show support members which may be utilized in lieu of support member 11 shown in FIGS. 1 and 2.

Briefly, FIG. 8 shows a support member 75 comprising a transparent disc of glass or a mirror 76 retained in an annular flange 77 of a tubular body 78 which can be of any suitable material. The pulley belt 71 can be in direct frictional engagement with the periphery of body 78. Alternately a pulley, comparable to pulley 59, can be attached to body 78 so as to be interposed between body 78 and pulley belt 71. The diameter of the body 78 obviously will depend upon such factors as the dimensions of openings 21 and 49 of plate 12 and bearing bracket 48 respectively.

FIG. 9 shows a support member 79 comprising a single body of transparent material, such as methylmethacryolate having an enlarged support platform portion 80 at one end of a cylindrical body portion 81.

The support members of FIGS. 8 and 9 are useful in situations where it is desired to be able to see the surface of an object on the support member which is in engagement with the support surface of the support member. Also the support member may, if desired, be comprised of common materials which are transparent to nonvisible light, such as infrared, depending upon the use for which the device 10 is to be employed. Various other modifications of the disclosed embodiment are possible. Thus for example of playless chain and sprocket or a playless gear train may be utilized in lieu of the shown pulley arrangement.

Devices constructed in accordance with the principles of the invention may be utilized in testing the electronic characteristic of flip-chip devices such as flip-chip diodes and flip-chip transistors. Such devices comprise semiconductor chips having at least one bump electrode on a major surface thereof. Thus, for example, an operator can place a flip-chip transistor having a plurality of bump electrodes on a surface thereof on a support platform and then translate and rotate the support platform until the electrodes are properly aligned for subsequent engagement with the test terminals of an electronic tester or classifying device. The device may be viewed through a side reversing microscope such as a high power biological microscope. Alternately, once the device is aligned as desired one may transfer the device to a work station where the bump electrodes are bonded to contact strips on a previously aligned support substrate. Obviously the foregoing specific applications are merely exemplary of uses to which the invention can be put.

I claim:
1. An alignment device comprising:
 first and second members,
 a rotatable support member carried by said first member,
 a movable control member mechanically coupled to said first and second members being selectably movable to translate said first member relative to said second member, and
 means mechanically coupling said control member to said support member for selectably producing rotation of said support member in response to movement of said control member.

2. The device of claim 1 wherein said first and second members are in the form of plates, and said plates are disposed in parallel relationship.

3. The device of claim 1 wherein said support member has a support surface adapted to receive an object thereon.

4. The device of claim 1 wherein said support member comprises a mirror surface adapted to receive an object thereon.

5. The device of claim 1 wherein said support member comprises a body of transparent material.

6. The device of claim 1 wherein said support member comprises a transparent member having a surface adapted to receive an object thereon mounted at one end of a tubular member.

7. The device of claim 1 wherein said control member is in the form of an elongated element.

8. The device of claim 1 wherein said control member is pivoted on one of said first and second members and has a portion thereof passing through an opening in the other of said first and second members whereby said first member may be translated relative to said second member by moving the control member about the pivot point.

9. The device of claim 1 further comprising guide means means for restricting the translation of said first member substantially within a single plane of reference.

10. The device of claim 1 wherein said support member is rotatable about a single axis thereof.

11. The device of claim 1 wherein the control member is rotatable about a single axis thereof to produce rotation of said support member about a single axis thereof.

12. The device of claim 1 in which the control member is rotatable and in which the means coupling the control member and support member comprises rotary means coupled to the control member for rotation thereby and a closed transmission loop frictionally coupled to respective rotatable surfaces of said control member and said rotary means.

13. The device of claim 1 wherein a portion of said rotatable support member is journaled in an annular ball bearing situated within an aperture in said first member.

14. The device of claim 1 further wherein said first and second members have surface portions abutting each other in slideable engagement.

15. The device of claim 1 further comprising means for biasing respective surface portions of said first and second members into slideable contact engagement.

16. The device of claim 1 further comprising guide means for guiding translation of said first member relative to said second member in a direction corresponding to a selected direction of movement of said control member.

17. The device of claim 16 wherein said guide means comprises a guide member interposed between respective surface portions of said first and second members.

18. The device of claim 17 wherein the guide means further comprises guide pins carried by at least one of said first and second members in cooperative relationship with guide slots in said guide member.

19. The device of claim 1 wherein the control member is rotatable about its axis, wherein rotary means is coupled with the control member for axial rotation in response to axial rotation of the control member, and wherein a resilient member provides frictional coupling between said control member and said rotary means whereby axial rotational movement of said control member produces axial rotational movement of said support member.

20. The device of claim 19 wherein said resilient member is of a material having a static friction coefficient the same as the moving friction coefficient eliminating slip-stick characteristics.

21. The device of claim 19 wherein said resilient member is of a material having a fluorocarbon substance or a fluorocarbon substance mixed with a suitable filler.

22. The device of claim 19 wherein the substance is selected from the group of polytetrafluoroethylene and polyfluoroethylenepropene.

23. The device of claim 19 wherein a portion of the control member is situated within the body of the resilient member.

24. A mechanical alignment device comprising:
   first and second plate like members having opposed major surfaces;
   a rotatable support member having a support platform adapted to receive an object thereon and having a shaft portion rotatably mounted in an aperture in said first member;
   an elongated control member pivotably supported by said second member and having a portion passing through an aperture in said first member whereby circular arc motion of said control member about its pivot produces corresponding planar translation of said first member relative to said second member;
   a transmission loop operatively coupling said shaft portion to said control member wherby axial rotation of said control member produces axial rotation of said shaft portion so that said support platform is rotated thereby, and
   a resilient sleeve interposed between a portion of said control member and said transmission loop.

25. An alignment fixture for positioning and orienting small objects comprising:
   first and second apertured plates,
   a support platform at one end of an axially rotatable shaft,
   an apertured bearing bracket attached to said first plate,
   respective annular ball bearings disposed in registering apertures in said first and second plates,
   respective portions of said rotatable shaft being rotatably journaled in the said annular ball bearings,
   a driveable pulley member attached to said rotatable shaft at a portion thereof intermediate said respective portions,
   additional annular ball bearings disposed in registering apertures in said plates at a location spaced from the location of the first mentioned registering apertures,
   a manually operable control lever having a first spherical member at one end thereof and a second spherical member at an intermediate location along said control lever,
   said one of said additional ball bearings associated with said first plate having an annular resilient sleeve member and a portion of an annular drive pulley situated therein,
   said second spherical member being in frictional engagement with said sleeve member,
   said portion of said annular drive pulley being interposed between said sleeve member and the associated roller bearing,
   a pulley belt coupling the driveable pulley to another portion of said drive pulley,
   means for compressing the sleeve member to determine the degree of friction engagement between said second spherical member and said sleeve,
   said first spherical member being pivotably mounted within said one of the additional ball bearings associated with said second plate,
   a yoke having a pair of legs secured to said second plate and a bridge portion between said legs overlying a portion of said first plate,
   first means spacing said bridge portion from the opposing surface of said first plate,
   said first means comprising a member depending from said yoke and in slideable engagement with a point on said opposing surface of said first plate,
   a guide plate interposed between first and second plates and having an aperture through which a portion of said control member extends,
   second means for spacing opposing surface portions of said plates from each other comprising a plurality of pins depending from said first plate into slideable engagement with said second plate,
   a plurality of guide pins depending respectively from said first and second plates into respective slots and apertures in said guide plate, and
   the foregoing elements being so arranged that axial rotation of said control member produces corresponding axial rotation of said support member and so that selected angular pivotal motion of said control member about said first spherical member causes said first plate to translate relative to said second plate in selected directions parallel to the plane of the surface of the second plate, whereby an object situated on said support platform may be positioned and oriented as described.

References Cited
UNITED STATES PATENTS 3,266,523   8/1966   Stevens _____ 74—471 X
3,396,598   8/1968   Grispo.

MILTON KAUFMAN, Primary Examiner

U.S. Cl. X.R.

74—471; 214—1; 269—58